(12) United States Patent
Nomura et al.

(10) Patent No.: US 6,589,367 B2
(45) Date of Patent: Jul. 8, 2003

(54) ANISOTROPIC RARE EARTH-BASED PERMANENT MAGNET MATERIAL

(75) Inventors: Tadao Nomura, Fukui-ken (JP); Ken Ohashi, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/017,387

(22) Filed: Dec. 18, 2001

(65) Prior Publication Data

US 2002/0121315 A1 Sep. 5, 2002

Related U.S. Application Data

(63) Continuation-in-part of application No. 09/590,077, filed on Jun. 9, 2000, now abandoned.

(30) Foreign Application Priority Data

Jun. 14, 1999 (JP) .......................................... 11-166558

(51) Int. Cl.⁷ .............................................. H01F 1/053
(52) U.S. Cl. ........................ 148/302; 420/83; 420/121
(58) Field of Search ........................ 148/302; 420/121, 420/83

(56) References Cited

U.S. PATENT DOCUMENTS

| | | | |
|---|---|---|---|
| 4,792,368 A | | 12/1988 | Sagawa et al. |
| 5,049,208 A | * | 9/1991 | Yajima et al. ............... 148/302 |
| 5,071,493 A | | 12/1991 | Mizoguchi et al. |
| 5,186,766 A | | 2/1993 | Iriyama et al. |
| 5,403,408 A | | 4/1995 | Krause et al. |
| 5,538,565 A | | 7/1996 | Akioka et al. |
| 5,565,043 A | * | 10/1996 | Akioka et al. ............... 148/302 |
| 6,183,571 B1 | * | 2/2001 | Inoue et al. ................ 148/302 |
| 6,302,972 B1 | * | 10/2001 | Hirosawa et al. ........... 148/101 |
| 6,329,894 B1 | * | 12/2001 | Kanekiyo et al. ........... 148/302 |
| 6,332,933 B1 | * | 12/2001 | Ma et al. .................... 148/101 |
| 6,352,599 B1 | * | 3/2002 | Chang et al. ................ 148/101 |
| RE37,666 E | * | 4/2002 | Kanekiyo et al. ........... 148/302 |

FOREIGN PATENT DOCUMENTS

JP     62-291901     12/1987

* cited by examiner

*Primary Examiner*—John Sheehan
(74) *Attorney, Agent, or Firm*—Wenderoth, Lind & Ponack, L.L.P.

(57) ABSTRACT

Disclosed is a magnetically anisotropic rare earth-based permanent magnet having a nanocomposite structure consisting of fine dispersion of a magnetically hard phase, e.g., $Nd_2Fe_{14}B$, in alignment relative to the easy magnetization axis, a magnetically soft phase and a non-magnetic phase having a melting point lower than those of the magnetically hard and soft phases. The permanent magnet is prepared in a process in which a quenched thin magnet alloy ribbon having a composition capable of forming a magnetically hard phase, magnetically soft phase and non-magnetic phase by a heat treatment is subjected to a heat treatment in a magnetic field of at least 3 T at a temperature not lower than the melting point of the non-magnetic phase so that the liquid phase formed from the non-magnetic phase serves to facilitate rotating orientation of the magnetically hard grains to be aligned in the direction of the magnetic field relative to the easy magnetization axis.

8 Claims, No Drawings

ANISOTROPIC RARE EARTH-BASED PERMANENT MAGNET MATERIAL

This is a continuation-in-part application from a U.S. patent application Ser. No. 09/590,077 filed Jun. 9, 2000 now abandoned.

BACKGROUND OF THE INVENTION

The present invention relates to a magnetically anisotropic rare earth-based permanent magnet material prepared by a unique method.

Rare earth-based permanent magnets currently under large-scale industrial mass production are classified into two types including Sm/Co-based magnets and Nd/Fe/B-based magnets, of which the demand for the magnets of the latter type is rapidly growing year by year in respects of their outstandingly high magnetic properties and relatively low material costs thereof as compared with the magnets of the former type.

Among several manufacturing methods heretofore developed for the preparation of the Nd/Fe/B-based permanent magnets, the most widely industrialized method is the so-called sintering method. The Nd/Fe/B-based permanent magnets prepared by this method have a metallographic structure of which the principal phase is the magnetically hard $Nd_2Fe_{14}B$ phase accompanied by a phase having a higher neodymium content than that, referred to as the Nd-rich phase hereinafter, and the $Nd_{11}Fe_4B_4$ phase, referred to as the B-rich phase hereinafter.

In the sintering method for the preparation of the above described Nd/Fe/B-based magnets, an alloy ingot having a composition of which the contents of neodymium and boron each in some excess over the stoichiometric proportion of the respective elements corresponding to the composition of the formula $Nd_2Fe_{14}B$ is a finely pulverized into a fine powder having a particle diameter of a few micrometers and the powder is compression-molded in a magnetic field into a powder compact consisting of the alloy particles having their easy magnetization axis aligned in the direction of the magnetic field followed by a heat treatment of the powder compact for sintering at about 1100° C. and aging of the sintered body at a lower temperature (see, for example, M. Sagawa, et al., Japanese Journal of Applied Physics, volume 26, 1987, page 785). The magnet thus obtained is a magnetically anisotropic permanent magnet having a high coercive force exhibited by virtue of the interface cleaning effect of the Nd-rich phase surrounding the grains of the principal phase of $Nd_2Fe_{14}B$.

Alternatively, the alloy powder can be obtained by pulverizing a quenched thin magnet alloy ribbon prepared by the so-called melt-span method in which a melt of the magnet alloy is ejected at the surface of a rotating quenching roller to be rapidly solidified thereon into the form of a thin ribbon (see, for example, R. W. Lee, Physics Letter, volume 46, 1985, page 790). The quenched thin ribbon of the magnet alloy prepared by the melt-spin method has a structure, like the alloy ingot prepared by casting of a melt, consisting of the $Nd_2Fe_{14}B$ phase as the magnetically hard principal phase but the grain diameter of this principal phase is much smaller than in the sintered magnets to be about the same order as the single magnetic domains in the range from 20 to 100 nm.

The quenched thin magnet alloy ribbons can be processed into permanent magnet blocks in three different ways. In the first method, a fine powder of the quenched thin ribbons is blended with a resin as a binder and the blend is shaped into the form of a magnet block of so-called resin-bond magnets. Although the process for the preparation of resin-bond magnets is simple and inexpensive, the resin-bond magnet is necessarily magnetically isotropic and the impregnation density of the magnetic particles is relatively low so that resin-bond magnets cannot be very excellent in the magnetic properties. In the second method, a powder of the quenched thin ribbons is shaped in a hot press to give a magnetically isotropic permanent magnet. In the third method, the isotropic bulk magnet obtained by the second method is further subjected to a hot-working treatment under a compressive force to have the magnetic particles with the easy magnetization axis aligned in the direction of compression (see, for example, Japanese Patent Kokai 60-100402).

On the other hand, extensive development works are now under way in order to accomplish further upgrading of the magnetic properties of rare earth-based permanent magnets of the next generation including so-called nanocomposite magnets highlighted in recent years (see, for example, E. F. Kneller, et al., IEEE Transaction Magnetics, volume 27, 1991, page 3588).

The metallographic structure of the rare earth-based nanocomposite permanent magnets is quite different from that of the conventional sintered magnets. Namely, the conventional magnets have the magnetically hard principal phase of $Nd_2Fe_{14}B$ but are free from magnetically soft phases of, for example, bcc-Fe and Fe-rich phases such as $Fe_3B$, $Fe_2B$ and the like. In contrast thereto, the nanocomposite magnets have a structure consisting of magnetically hard and magnetically soft phases finely dispersed each in the other in fineness of an order of several tens nanometers, in which an exchange coupling of magnetization is exhibited between the magnetically hard and soft phases inhibiting reversal of magnetization of the magnetically soft phase leading to a behavior of the whole magnet body as if it consists of a single magnetically hard phase. This principle of nanocomposite magnets provides a possibility of obtaining a greatly increased saturation magnetization without adversely affecting the coercive force even as a combination with other known materials. According to the result of theoretical calculation reported by R. Skomski, et al. in Physical Review B, volume 48, 1993, page 15812, the possible largest value of the maximum energy product $(BH)_{max}$ is 137 MGOe for the system of $Sm_2Fe_{17}N_3/(Fe,Co)$.

Several reports are available on the actual preparation of rare earth-based nanocomposite permanent magnets including R. Coehoorn, et al., Journal de Physique, volume 49, 1988, page C8-669, for the $Nd_2Fe_{14}B/Fe_3B$ magnets, Japanese Patent Kokai 7-173501 and 7-176417 and L. Withanawasam, et al., Journal of Applied Physics, volume 76, 1994, page 7065, for $Nd_2Fe_{14}B/Fe$ magnets and J. D. Ding, et al., Journal of Magnetism and Magnetic Materials, volume 124, 1993, page L1, for $Sm_2Fe_{17}N_3/Fe$ magnets.

Each of the methods disclosed in these reports and patent documents for the preparation of the nanocomposite magnets utilizes microcrystallization by the heat treatment of a powder of a quenched thin alloy ribbon prepared by the melt-spin method or an amorphous alloy prepared by the mechanical alloying method so that alignment of the magnetic grains cannot be accomplished likewise in the above described resin-bond magnets not to give a magnetically anisotropic high-performance permanent magnet.

While attempts were made for the preparation of a bulk magnet of nanocomposite structure by utilizing a hot press as reported in J. Wecker, et al., Journal of Applied Physics Letter, volume 67, 1995, page 563, M. Jurczyk, et al., Journal of Alloys and Compounds, volume 230, 1995, page L1, Kojima, et al., Synopsis of 21st Scientific Lectures of Japan Applied Magnetics Society, 1997, page 384, and elsewhere, the magnets obtained by this method are close to a magnetically isotropic magnet as being little imparted with magnetic anisotropy.

Thus, it is the present status of the magnet technology that no industrially applicable method is reported for the preparation of a magnetically anisotropic nanocomposite permanent magnet notwithstanding the eager desire to obtain rare earth-based high-performance permanent magnets which can be expected according to the results of the theoretical calculation.

SUMMARY OF THE INVENTION

The present invention accordingly has an object to provide a method for the preparation of a high-performance rare earth-based magnetically anisotropic permanent magnet having a nanocomposite metallographic structure consisting of a magnetically hard phase and a magnetically soft phase finely dispersed each in the other, of which the grains of the magnetically hard phase are aligned relative to the easy magnetization axis.

Thus, the present invention provides a method for the preparation of a magnetically anisotropic rare earth-based permanent magnet material having a nanocomposite metallographic structure consisting of a magnetically hard phase and a magnetically soft phase finely dispersed each in the other, which comprises the step of subjecting a quenched thin magnetic alloy ribbon of a composition, from which a magnetically hard phase, a magnetically soft phase and a non-magnetic phase having a melting point lower than the melting points of the magnetically hard and soft phases are formed by a heat treatment, to a heat treatment for crystallization in a magnetic field of at least 3 T at a temperature not lower than the melting point of the non-magnetic phase or the eutectic point between the non-magnetic phase and the magnetically hard or soft phase.

The magnetically anisotropic nanocomposite rare earth-based permanent magnet material prepared by the above described inventive method is characterized by the metallographic structure comprising a magnetically hard phase of which the grains are aligned in a direction relative to the easy magnetization axis, a magnetically soft phase and a non-magnetic phase having a melting point lower than the melting points of the magnetically hard and soft phases, in which the magnetically hard and soft phases are dispersed in nanometer-order fineness in the non-magnetic phase.

In particular, the above mentioned magnetically hard phase is the $R_2(Fe,Co)_{14}B$ phase, in which R is one or a combination of the rare earth elements selected from the group consisting of praseodymium, neodymium, terbium and dysprosium and the magnetically soft phase comprises one or more of the bcc-Fe, a Fe/Co alloy, $(Fe,Co)_3B$ and $(Fe,Co)_2B$ phases, the volume fraction of the magnetically soft phase being in the range from 5 to 60%.

Further particularly, the above mentioned non-magnetic phase comprises one or more of the phases of $RCu_2$, lanthanum, $LaCu_2$, a La/Cu alloy of which the content of lanthanum is at least 25 atomic %, $La_3Co$ and La/Co alloy of which the content of lanthanum is at least 55 atomic %, the volume fraction of the non-magnetic phase being in the range from 3 to 30%.

DETAILED DESCRIPTION OF THE PREFERRED EMBODIMENTS

As is described above, the magnetically anisotropic nanocomposite rare earth-based permanent magnet material prepared by the inventive method is characterized by the metallographic structure comprising a magnetically hard phase as the first phase, of which the grains are aligned relative to the direction of the easy magnetization axis, a magnetically soft phase as the second phase and a non-magnetic phase as the third phase having a melting point lower than the melting points of the magnetically hard and soft phases but not lower than room temperature, in which the magnetically hard and soft phases are dispersed in nanometer-order fineness in the non-magnetic phase.

The magnetically hard phase is the phase of $R_2(Fe,Co)_{14}B$, in which R is a rare earth element selected from the group consisting of praseodymium, neodymium, terbium and dysprosium while the magnetically soft phase comprises one or more of the phases of bcc-Fe, Fe/Co alloys, $(Fe,Co)_3B$ and $(Fe,Co)_2B$. The non-magnetic phase comprises one or more of the phases of $RCu_2$, La, $LaCu_2$, La/Cu alloy of 25 atomic % of higher lanthanum content, $La_3Co$ and La/Co alloy of 55 atomic % or higher lanthanum content.

The procedure for the preparation of the above described inventive permanent magnet material is as follows. Firstly, a melt of the magnetic alloy having a specified composition is subjected to the melt-spin method to give a quenched thin ribbon of the magnetic alloy consisting of an amorphous phase and microcrystals dispersed therein. Thereafter, the quenched thin alloy ribbon is subjected to the heat treatment at a temperature not lower than the melting point of the non-magnetic phase in a strong magnetic field thus to give a metallographic structure consisting of the three phases, of which the grains of the magnetically hard phase are aligned relative to the easy magnetization axis. The elementary composition of the alloy melt is selected in such a way that, when the solidified alloy is subjected to the heat treatment, a magnetically hard phase, magnetically soft phase and non-magnetic phase of a low melting point are precipitated therefrom to give a structure in which the first and second phases are finely dispersed in the third phase.

In the magnet material after the above mentioned heat treatment for phase precipitation, the volume fraction of the magnetically soft phase is in the range from 5 to 60%. When the volume fraction of the magnetically soft phase is too small, no significant improvement can be accomplished in the saturation magnetization of the magnet which can be high enough only in nanocomposite magnets. When the volume fraction of the magnetically soft phase is too large, on the other hand, the volume fraction of the magnetically hard phase is correspondingly decreased so greatly that the coercive force of the magnet is greatly decreased.

The elementary composition of the alloy melt is selected, on the other hand, such that the volume fraction of the non-magnetic phase of low melting point in the final magnet material is in the range from 3 to 30%. When this volume fraction of the non-magnetic phase is too small, the advantageous effect to be obtained with the non-magnetic phase can hardly be obtained as a matter of course while, when the volume fraction is too large, a great decrease is sometimes resulted in the saturation magnetization of the magnet as a consequence of the decreased volume fractions of the magnetically hard and soft phases.

While the rare earth element denoted by R in the invention can be one or any combination of praseodymium, neodymium, terbium and dysprosium, following descriptions are given for neodymium only as the most typical and promising element among the above mentioned four rare earth elements.

When a system of $Nd_2Fe_{14}B/bcc-Fe/NdCu_2$ is desired as the combination of the magnetically hard and soft phases and non-magnetic phase, for example, it is preferable that the alloy melt has a composition consisting of, in atomic proportions, around 2 to 14% of Nd, 1 to 8% of B and 1 to 8% of Cu, the balance being Fe. When $Nd_2Fe_{14}B/Fe_3B/NdCu_2$ is desired, the alloy melt preferably consists of 2 to 10% of Nd, 15 to 25% of B and 1 to 8% of Cu, the balance being Fe. When $Nd_2Fe_{14}B/Fe_2B/NdCu_2$ is desired, the alloy melt preferably consists of 2 to 10% of Nd, 25 to 35% of B and 1 to 8% of Cu, the balance being Fe. When the composition of the alloy melt is intermediate of the above given compositions, the magnetically soft phase of the magnet material may comprise a combination of bcc-Fe, $Fe_3B$ and $Fe_2B$ or, by replacing 1 to 10 atomic % of Fe with Co, Fe/Co alloy, $(Fe,Co)_3B$ and $(Fe,Co)_2B$ along with introduction of cobalt into the magnetically hard phase.

As to the composition of the alloy melt for the magnet material of which the non-magnetic phase is La, a combination of $Nd_2Fe_{14}B/bcc$-Fe/La is obtained from a composition of 2 to 10% of Nd, 1 to 8% of B and 1 to 8% of La, the balance being Fe. A combination of $Nd_2Fe_{14}B/Fe_3B/La$ is obtained from a composition of 2 to 8% of Nd, 15 to 25% of B and 1 to 8% of La, the balance being Fe. A combination of $Nd_2Fe_{14}B/Fe_2B/La$ is obtained from a composition of 2 to 8% of Nd, 25 to 35% of B and 1 to 8% of La, the balance being Fe.

As to the composition of the alloy melt for the magnet material of which the non-magnetic phase is $LaCu_2$, a combination of $Nd_2Fe_{14}B/bcc$-Fe/$LaCu_2$ is obtained from a composition of 2 to 10% of Nd, 1 to 8% of B, 1 to 8% of La and 3 to 5% of Cu, the balance being Fe. A combination of $Nd_2Fe_{14}B/Fe_3B/LaCu_2$ is obtained from a composition of 2 to 8% of Nd, 15 to 25% of B, 1 to 8% of La and 3 to 5% of Cu, the balance being Fe. A combination of $Nd_2Fe_{14}B/Fe_2B/LaCu_2$ is obtained from a composition of 2 to 8% of Nd, 25 to 35% of B, 1 to 8% of La and 3 to 5% of Cu, the balance being Fe.

As to the composition of the alloy melt for the magnet material of which the non-magnetic phase is a La/Cu alloy, a combination of $Nd_2Fe_{14}B/bcc$-Fe/(La/Cu) is obtained from a composition of 2 to 10% of Nd, 1 to 8% of B, 1 to 8% of La and 1 to 3% of Cu, the balance being Fe. A combination of $Nd_2Fe_{14}B/Fe_3B/(La/Cu)$ is obtained from a composition of 2 to 8% of Nd, 15 to 25% of B, 1 to 8% of La and 1 to 3% of Cu, the balance being Fe. A combination of $Nd_2Fe_{14}B/Fe_2B/(La/Cu)$ is obtained from a composition of 2 to 8% of Nd, 25 to 35% of B, 1 to 8% of La and 1 to 3% of Cu, the balance being Fe.

When the alloy melt composition containing lanthanum is intermediate of the above described compositions, it is also possible that the magnetically soft phase is a combination of the phases of bcc-Fe, $Fe_3B$ and $Fe_2B$ or Fe/Co alloy, $(Fe,Co)_3B$ and $(Fe,Co)_2B$ by replacing 1 to 10 atomic % of Fe with Co along with introduction of cobalt into the magnetically hard phase.

When the non-magnetic phase is $La_3Co$ or a La/Co alloy, it is of course that the non-magnetic phase must always contain cobalt. A combination of $Nd_2(Fe,Co)_{14}B/(Fe/Co$ alloy)/$La_3Co$ can be obtained from an alloy melt having a composition of 2 to 10% of Nd, 3 to 10% of Co, 1 to 8% of B and 1 to 8% of La, the balance being Fe. A combination of $Nd_2(Fe,Co)_{14}B/(Fe,Co)_3B/La_3Co$ can be obtained from an alloy melt having a composition of 2 to 8% of Nd, 3 to 10% of Co, 15 to 25% of B and 1 to 8% of La, the balance being Fe. A combination of $Nd_2(Fe,Co)_{14}B/(Fe,Co)_2B/La_3Co$ can be obtained from an alloy melt having a composition of 2 to 8% of Nd, 3 to 10% of Co, 25 to 35% of B and 1 to 8% of La, the balance being Fe.

A combination of $Nd_2(Fe,Co)_{14}B/(Fe/Co$ alloy)/(La/Co) can be obtained from an alloy melt having a composition of 2 to 10% of Nd, 1 to 3% of Co, 1 to 8% of B and 1 to 8% of La, the balance being Fe. A combination of $Nd_2(Fe,Co)_{14}B/(Fe,Co)_3B/(La/Co)$ can be obtained from an alloy melt having a composition of 2 to 8% of Nd, 1 to 3% of Co, 15 to 25% of B and 1 to 8% of La, the balance being Fe. A combination of $Nd_2(Fe,Co)_{14}B/(Fe,Co)_2B/(La/Co)$ can be obtained from an alloy melt having a composition of 2 to 8% of Nd, 1 to 3% of Co, 25 to 35% of B and 1 to 8% of La, the balance being Fe.

It is optional with an object to further improve various properties of the magnet material that the alloy composition is admixed with one or more of the adjuvant elements selected from the group consisting of aluminum, silicon, titanium, vanadium, chromium, manganese, nickel, copper, zinc, gallium, zirconium, niobium, molybdenum, ruthenium, rhodium, palladium, silver, cadmium, indium, tin, hafnium, tantalum, tungsten, rhenium, osmium, iridium, platinum, gold, thallium, lead and bismuth as a replacement of up to 5 atomic % of iron. When the amount of these adjuvant elements is too large, the magnet material suffers a decrease in the saturation magnetization.

As is mentioned before, the rare earth element R is not limited to neodymium but can be any one or any combination of praseodymium, neodymium, terbium and dysprosium. In view of the expensiveness of a highly purified single rare earth element in the metallic form, it is further optional that a small portion, e.g., up to 5 atomic %, of the rare earth element or elements R is replaced with other rare earth elements.

Quenching of the alloy melt can be performed in several different methods including the quenching roller method, splat method and gas atomizing method, of which the quenching roller method for the preparation of a quenched thin alloy ribbon is the most advantageous in respect of the simplicity of the process and high quality of the solidified magnet alloy. When a copper-made quenching roller is used, the roller is rotated at a peripheral velocity of, preferably, 10 to 50 meters per second to obtain good quality of the quenched thin alloy ribbons. When the peripheral velocity of the quenching roller is too low, the quenched thin alloy ribbon cannot be imparted with sufficient amorphousness while, when the velocity is too high, difficulties are sometimes encountered in accomplishing crystallization of the alloy in the subsequent step of heat treatment. The quenched thin magnet alloy ribbon having an amorphous structure of the alloy can be crystallized by subjecting the thin ribbon to a heat treatment in an atmosphere of an inert gas or in vacuum.

While it is known that a nanocomposite structure consisting of a magnetically hard phase and a magnetically soft phase finely dispersed each in the other can be obtained by quenching of a melt of the magnetic alloy followed by a crystallizing heat treatment, the very scope of the inventive method consists in that the crystallizing heat treatment is conducted in a strong magnetic field of at least 3 T or, preferably, in the range from 3 to 10 T so that the grains of the magnetically hard phase are aligned relative to the easy magnetization axis to give a magnetically anisotropic permanent magnet.

In the nanocomposite permanent magnet structure here implied, the average crystalline grain diameter of each of the magnetically soft and magnetically hard phases is in the range from 20 to 200 nm. When the average grain diameter is too small, crystallization of the respective phases is sometimes incomplete and, when the average grain diameter is too large, the exchange coupling of magnetization between the phases cannot be high enough adversely affecting the magnetic properties of the permanent magnet.

It is also known that permanent magnets of a precipitation-type alloy such as alnico magnets can be imparted with magnetic anisotropy by a heat treatment in a magnetic field. When an alnico magnet heated at a high temperature is cooled in a magnetic field, the high-temperature $\alpha$-phase is decomposed into the strongly magnetic $\alpha_1$-phase and the $\alpha_2$-phase of low magnetization where the $\alpha_1$-phase is formed in the form of elongated grains of a single magnetic domain size having large shape anisotropy. In a practical procedure, the magnet body after a solubilizing treatment at a high temperature into a single phase is quenched down to 950° C. in order to suppress precipitation of the $\gamma$-phase followed by a slow cooling step at a cooling rate of 0.1 to 2° C./second from 900° C. to 700° C. in a magnetic field of at least 0.15 T to give a permanent magnet by utilizing the shape anisotropy of the strongly magnetic $\alpha_1$-phase. It is important in the alnico magnets that the decomposition temperature is in the vicinity of the Curie point.

In contrast thereto, the magnetically hard phase of $R_2(Fe,Co)_{17}B$ in the present invention or, in particular, $Nd_2Fe_{14}B$ has a Curie point at 312° C. which is substantially lower than the crystallization temperature so that the effect exhibited in the alnico magnets cannot be expected here. Incidentally, the phase of $Nd_2Co_{14}B$ has a high melting point of 730° C. but the easy magnetization axis of this phase lies within the C-plane and is not uniaxial so that unidirectional alignment of the crystal grains relative to the easy magnetization axis can hardly be accomplished.

It is taught, on the other hand, that a magnetic force can act by a strong magnetic field having a gradient even in a paramagnetic body as an influence of the extremely low magnetic susceptibility as in a ferromagnetic body (Hirota, et al., Electric Society Magnetics Symposium, MAG-96-214, 1996). The magnetic force $f_M$ acting on the substance having a magnetic susceptibility $\chi$ is given by the equation (1) below:

$$f_M = (\chi - \chi_0) \cdot (H/\mu_0) \cdot (\partial H/\partial X), \quad (1)$$

where $\chi_0$ is the magnetic susceptibility of the ambience of the substance, H is a magnetic field applied to the substance, $\mu_0$ is the vacuum magnetic permeability and $\partial H/\partial X$ is the gradient of the magnetic field at the position of the substance. When this magnetic force $f_M$ surpasses the lattice vibration, the generated nuclei are arranged relative to the crystalline orientation in one direction to give a magnetically anisotropic material relative to the easy magnetization axis.

While the equation (1) above teaches that a large magnetic force $f_M$ can be obtained by increasing the gradient of the magnetic field $\partial H/\partial X$, it is practically a difficult matter to directly control this value. A convenient method for controlling the gradient of the magnetic field is to vary the maximum value of the applied magnetic field H. As a result of the experimental works with varied magnetic fields H, the inventors have arrived at a discovery that a tendency of orientation can be found in the $Nd_2Fe_{14}B$ phase as formed when the magnetic field H is varied to exceed 3 T.

As the most characteristic feature of the inventive method, orientation of the above mentioned magnetically hard phase can be further promoted when the alloy has such a composition that, along with a magnetically hard phase and a magnetically soft phase, a non-magnetic phase having a melting point lower than those of the magnetically hard and soft phases but not lower than room temperature is concurrently formed by a heat treatment and the heat treatment is conducted at a temperature not lower than the melting point of the non-magnetic phase or the eutectic point between the non-magnetic phase and the other phases. This is presumably because the liquid phase formed from the non-magnetic phase intervenes between the grains of the magnetically hard phase to facilitate smooth rotation of the grains. It is the discovery leading to the present invention that this rotation-facilitating effect of the liquid phase of the non-magnetic phase can be exhibited when the non-magnetic phase is the phase of $NdCu_2$, La, $LaCu_2$, La/Cu alloy, $La_3Co$ or La/Co alloy mentioned before. These non-magnetic phases are thermodynamically compatible with the magnetically hard phase of $R_2(Fe,Co)_{14}B$ and the magnetically soft phases of bcc-Fe, $Fe_3B$ and $Fe_2B$ as well as Fe/Co alloys, $(Fe,Co)_3B$ and $(Fe,Co)_2B$.

In the following, a description is given of each of these non-magnetic phases.

$NdCu_2$ is an intermetallic compound having a melting point of 840° C. and rapidly formed by crystallization when an amorphous alloy of the above mentioned composition is heated under increasing temperature. This phase is converted into a liquid phase when heated at 840° C. or higher to contribute to the c-axis orientation of the $Nd_2Fe_{14}B$ crystals in a strong magnetic field.

La is a rare earth element which, different from neodymium, has a unique characteristic that no intermetallic compounds nor solid solution are formed with iron. It is also known that La hardly forms a crystal of $La_2Fe_{14}B$ enabling coexistence of the three phases of $R_2Fe_{14}B$, bcc-Fe and La to play a role of the Nd-rich phase.

Cu is an element repulsive to Fe and, like La, forms no intermetallic compounds with Fe so that the phases of $LaCu_2$ and La/Cu alloys can be, like the elementary phase of La, coexistent with the magnetically soft phases. The intermetallic compound of $LaCu_2$ is converted into a liquid phase at the melting point of 830° C. or higher. When the content of La is 25 atomic % or higher, eutectic alloys are formed between La and LaCu, between LaCu and $LaCu_2$ and between $LaCu_2$ and $LaCu_3$ to give eutectic points lower than the melting point of La. In particular, an alloy of 71 atomic % of La and 29 atomic % of Cu has a eutectic point at 475° C. enabling crystal orientation even at this relatively low temperature to contribute to increased fineness of the nanocomposite structure resulting in an increase of the coercive force by virtue of the enhancement of the exchange coupling force.

While no intermetallic compounds are formed between La and Fe, on the other hand, La and Co form several intermetallic compounds such as $Lu_3Co$, $La_2Co_{1.7}$, $La_2Co_3$, $La_2Co_7$ and others. In an alloy composition with addition of an appropriate amount of Co, as is mentioned before, coexistence can be accomplished for the combinations of the phases such as $R_2(Fe,Co)_{14}B/(Fe,Co)/La_3Co$, $R_2(Fe,Co)_{14}B/(Fe,Co)/(La/Co)$ and the like. $La_3Co$ has a melting point at 545° C. A eutectic point lower than this melting point can be obtained with a La/Co alloy phase of at least 55 atomic % of the La content. For example, the eutectic points are 500° C. and 520° C. in the phases of 69 atomic % La-31 atomic % Co and 80 atomic % La-20 atomic % Co, respectively. These non-magnetic phases serve as an important factor for the preparation of excellent magnetically anisotropic nanocomposite permanent magnets with fine dispersion of the magnetically hard and soft phases.

In the following, the present invention is described in more detail by way of Examples which, however, never limit the scope of the invention in any way.

EXAMPLE 1

A magnetic alloy in a total amount of 20 g prepared from, in atomic % proportions, 10% of Nd, 80% of Fe, 4% of B and 6% of Cu taken each in the elementary or metallic form of at least 99% purity was remelted in a fused silica glass tube having an orifice of 0.5 mm diameter and the melt was ejected under pressurization with argon gas at the surface of a quenching roller of copper rotating at a peripheral velocity of 47.5 meters/second to give a quenched thin ribbon of the alloy which had an amorphous structure as identified from the result of the X-ray diffractometric test using the Cu K α line.

By using a tubular furnace having the furnace tube built in a superconductive electromagnet, the quenched thin alloy ribbon was subjected to a heat treatment at 950° C. in a magnetic field of 5 T. The non-magnetic phase thus formed had a melting point $T_m$ at 840° C.

The thus heat-treated thin alloy ribbon was sealed in a fused silica glass tube under a reduced pressure of 200 Torr and the tube was introduced into a tubular furnace under a gradient magnetic field in which the alloy was heated up to the temperature $T_m$ and kept at the same temperature for 30 to 60 minutes followed by quenching in water.

The thus quenched alloy sample was examined on a transmission electron microscopic or scanning electron microscopic electron reflection photograph to detect the magnetically soft and non-magnetic phases, of which the volume fractions were 27% and 12%, respectively, as determined from the cross sectional areas of the respective phases in the photographs.

A powder of the alloy sample was blended with molten paraffin and the blend was solidified in a magnetic field of 14 kOe into a block of which magnetization was measured by the method of VSM measurement with application of a magnetic field of 20 kOe in the direction perpendicular or parallel to the direction of the magnetic field in the solidification of the paraffin blend to obtain the values of magnetization $I_a$ and $I_p$. The ratio of $I_a$ to $I_p$, i.e. $I_a:I_p$, as a measure of the magnetic anisotropy was 0.64. A smaller value of this ratio corresponds to a greater magnetic anisotropy of the magnetic particles.

EXAMPLES 2 TO 15 AND COMPARATIVE EXAMPLES 1 TO 5

The experimental procedure in each of these Examples and Comparative Examples was substantially the same as in Example 1 described above except that the alloy melt had a composition indicated in Table 1 in atomic proportions of the respective elements shown in the table. The magnetic field applied to the thin alloy ribbon in the heat treatment was always 5 T excepting Examples 2, 3 and 6 in which the magnetic field was 3 T, Comparative Examples 2 and 5 in which the magnetic field was 1 T and Comparative Examples 1, 3 and 4 in which no magnetic field was applied.

Table 2 below shows the temperature of the heat treatment of the quenched thin alloy ribbons, melting points of the non-magnetic phases formed by the heat treatment, volume fractions of the magnetically soft and non-magnetic phases and the ratio of $I_a:I_p$. The crystallographic measurements for the volume fractions of the magnetically soft and non-magnetic phases and the average crystalline grain diameter were not undertaken in the Comparative Examples since the magnets obtained there were not anisotropic as is understood from the values of $I_a:I_p$.

As is understood from the values of $I_a:I_p$ ratios in the Comparative Examples, high magnetic anisotropy of the alloy powder can be obtained only by applying a magnetic field of 3 T or larger in the heat treatment of the quenched thin alloy ribbons.

TABLE 1

| No. | Alloying element, atomic % | | | | | | | | |
|---|---|---|---|---|---|---|---|---|---|
| | Nd | Pr | Tb | Dy | Fe | Co | B | Cu | La |
| Example 1 | 10 | — | — | — | 80 | — | 4 | 6 | — |
| Example 2 | 5 | — | 1 | — | 60 | 6 | 20 | 8 | — |
| Example 3 | 1 | 2 | — | 2 | 61 | — | 30 | 4 | — |
| Example 4 | — | 8 | — | — | 80 | — | 4 | — | 8 |
| Example 5 | 4 | — | — | 2 | 70 | 3 | 16 | — | 5 |
| Example 6 | 3 | 1 | — | — | 49 | 8 | 33 | — | 6 |
| Example 7 | 7 | — | — | — | 82 | — | 3 | 2 | 6 |
| Example 8 | 2 | 2 | — | — | 76 | 3 | 6 | 3 | 8 |
| Example 9 | — | 3 | 1 | — | 75 | — | 17 | 1 | 3 |
| Example 10 | 6 | — | — | 2 | 73 | 9 | 5 | — | 5 |
| Example 11 | 3 | 2 | — | — | 70 | 6 | 17 | — | 2 |
| Example 12 | — | 3 | — | 1 | 49 | 9 | 31 | — | 7 |
| Example 13 | — | 8 | — | — | 77 | 4 | 4 | — | 7 |
| Example 14 | 4 | — | — | — | 68 | 2 | 20 | — | 6 |
| Example 15 | 4 | — | — | — | 52 | 4 | 33 | — | 7 |
| Comparative Example 1 | 10 | — | — | — | 80 | — | 4 | 6 | — |
| Comparative Example 2 | 1 | 2 | — | 2 | 61 | — | 30 | 4 | — |
| Comparative Example 3 | — | 8 | — | — | 80 | — | 4 | — | 8 |
| Comparative Example 4 | 3 | 2 | — | — | 70 | 6 | 17 | — | 2 |
| Comparative Example 5 | — | 8 | — | — | 77 | 4 | 4 | — | 7 |

TABLE 2

| No. | | Temperature of heat treatment, °C. | $T_m$, °C. | Average crystal grain size, nm | Volume fraction, %, of magnetically soft phase | Volume fraction, %, of non-magnetic phase | $I_a:I_p$ |
|---|---|---|---|---|---|---|---|
| Example | 1 | 950 | 840 | 185 | 27 | 12 | 0.64 |
| | 2 | 890 | 850 | 140 | 53 | 23 | 0.90 |
| | 3 | 900 | 870 | 131 | 59 | 10 | 0.93 |
| | 4 | 870 | 780 | 168 | 19 | 18 | 0.60 |
| | 5 | 850 | 820 | 100 | 32 | 13 | 0.69 |
| | 6 | 870 | 840 | 110 | 37 | 18 | 0.81 |
| | 7 | 550 | 480 | 22 | 29 | 12 | 0.59 |
| | 8 | 710 | 540 | 85 | 38 | 24 | 0.79 |
| | 9 | 680 | 560 | 39 | 47 | 10 | 0.82 |
| | 10 | 790 | 600 | 67 | 20 | 14 | 0.59 |
| | 11 | 850 | 730 | 94 | 44 | 7 | 0.76 |
| | 12 | 900 | 850 | 120 | 32 | 25 | 0.77 |
| | 13 | 890 | 550 | 165 | 19 | 18 | 0.60 |
| | 14 | 800 | 580 | 98 | 45 | 17 | 0.81 |
| | 15 | 980 | 600 | 123 | 34 | 24 | 0.80 |
| Comparative Example | 1 | 870 | 840 | — | — | — | 0.98 |
| | 2 | 700 | 870 | — | — | — | 0.98 |
| | 3 | 900 | 780 | — | — | — | 0.98 |
| | 4 | 860 | 730 | — | — | — | 0.98 |
| | 5 | 870 | 550 | — | — | — | 0.98 |

What is claimed is:

1. A magnetically anisotropic (rare earth)/(iron,cobalt)/boron-based nanocomposite permanent magnet material, in which the rare earth element is selected from the group consisting of praseodymium, neodymium, terbium and dysprosium, having a metallographic structure comprising a magnetically hard phase of which the crystalline grains are aligned in a direction relative to the easy magnetization axis, a magnetically soft phase consisting of crystalline grains and a non-magnetic phase having a melting point lower than the melting points of the magnetically hard and soft phases, in which the crystalline grains of each of the magnetically hard and soft phases have an average grain diameter in the range from 20 to 200 nm and are dispersed in the non-magnetic phase, and wherein the non-magnetic phase is selected from the group consisting of $RCu_2$, in which R is a rare earth element selected from the group consisting of praseodymium, neodymiun, terbium and dysprosium, La, $LaCu_2$, La—Cu alloys of which the content of La is at least 25 atomic %, La—Co and alloys of which the content of La is at least 55 atomic %.

2. The magnetically anisotropic (rare earth)/(iron,cobalt)/boron-based nanocomposite permanent magnet material as defined in claim 1 which is a product prepared by the method comprising the step of subjecting a quenched thin magnetic alloy ribbon of a composition, from which a magnetically hard phase, a magnetically soft phase and a non-magnetic phase having a melting point lower than the melting points of the magnetically hard and soft phases are formed by a heat treatment, to a heat treatment for crystallization in a magnetic field of at least 3 T at a temperature not lower than the melting point of the non-magnetic phase or the eutectic point between the non-magnetic phase and the magnetically hard or soft phase but lower than the melting points of the magnetically hard and soft phases.

3. The magnetically anisotropic (rare earth)/(iron,cobalt)/boron-based nanocomposite permanent magnet material as claimed in claim 1 in which the magnetically hard phase is a phase of the formula $R_2(Fe,Co)_{14}B$, in which R is a rare earth element selected from the group consisting of praseodymium, neodymium, terbium and dysprosium.

4. The magnetically anisotropic (rare earth)/(iron,cobalt)/boron-based nanocompsite permanent magnet material as claimed in claim 1 in which the magnetically soft phase is selected from the group consisting of the phases of bcc-Fe, Fe—Co alloys, $(Fe,Co)_3B$ and $(Fe,Co)_2B$.

5. The magnetically anisotropic (rare earth)/(iron,cobalt)/boron-based nanocomposite permanent magnet material as claimed in claim 1 in which the volume fraction of the magnetically soft phase is in the range from 5 to 60%.

6. The magnetically anisotropic (rare earth)/(iron,cobalt)/boron-based nanocomposite permanent magnet material as claimed in claim 1 in which the volume fraction of the non-magnetic phase is in the range from 3 to 30%.

7. The magnetically anisotropic (rare earth)/(iron,cobalt)/boron-based nanocomposite permanent magnet material as claimed in claim 1 in which the rare earth element is neodymium.

8. The magnetically anisotropic (rare earth)/(iron,cobalt)/boron-based nanocomposite permanent magnet material as claimed in claim 1 in which the amount of cobalt is in the range from 1 to 10 atomic % based on the total amount of iron and cobalt.

* * * * *